United States Patent
Saenz et al.

(10) Patent No.: US 11,238,400 B2
(45) Date of Patent: Feb. 1, 2022

(54) METHODS AND SYSTEMS FOR OPTIMIZING THE POOLING AND SHIPPING OF FREIGHT

(71) Applicant: Flock Freight, Inc., Solana Beach, CA (US)

(72) Inventors: Luis Saenz, Encinitas, CA (US); Oliver Lum, Solana Beach, CA (US); Michael Palodichuk, San Diego, CA (US); Oren Zaslansky, Cardiff by the Sea, CA (US); Peter Frys, Carlsbad, CA (US)

(73) Assignee: Flock Freight, Inc., Solana Beach, CA (US)

( * ) Notice: Subject to any disclaimer, the term of this patent is extended or adjusted under 35 U.S.C. 154(b) by 0 days.

(21) Appl. No.: 17/118,132

(22) Filed: Dec. 10, 2020

(65) Prior Publication Data
US 2021/0182791 A1    Jun. 17, 2021

Related U.S. Application Data

(60) Provisional application No. 62/948,157, filed on Dec. 13, 2019.

(51) Int. Cl.
*G06Q 10/08* (2012.01)
*G06Q 10/04* (2012.01)
*G06Q 30/02* (2012.01)

(52) U.S. Cl.
CPC ....... *G06Q 10/08355* (2013.01); *G06Q 10/04* (2013.01); *G06Q 10/0836* (2013.01); *G06Q 30/0283* (2013.01)

(58) Field of Classification Search
CPC ............. G06Q 10/08355; G06Q 10/04; G06Q 10/0836; G06Q 30/0283
(Continued)

(56) References Cited

U.S. PATENT DOCUMENTS

| 7,050,995 B2 | 5/2006 | Wojcik |
| 7,257,552 B1 | 8/2007 | Franco |

(Continued)

FOREIGN PATENT DOCUMENTS

| CA | 2337656 A1 | 8/2001 |
| TW | 358677 B | 2/2012 |

(Continued)

OTHER PUBLICATIONS

Chu, Ching-Wu. "A heuristic algorithm for the truckload and less-than truckload problem". Published Sep. 2005. https://www.sciencedirect.com/science/article/pii/S0377221704000888 (Year: 2005).*

(Continued)

*Primary Examiner* — George Chen
*Assistant Examiner* — Lisa Ma
(74) *Attorney, Agent, or Firm* — Blueshift IP, LLC; Cynthia M. Gilbert

(57) ABSTRACT

A method for pooling a plurality of shipments of less than full truckloads of freight to create a full truckload while providing a full truckload service level guarantee includes receiving a request for a first shipment of less than a full truckload of freight between an origin and a destination by a specified delivery date in accordance with a level of service guaranteed for a full truckload of freight. The method includes providing a commitment to ship the shipment as requested. The method includes receiving, after providing the commitment to ship the shipment for the first shipper, a request from a second shipper for delivery of a second shipment of less than a full truckload of freight. The method includes determining to combine the first shipment and the second shipment into a full truckload of freight.

20 Claims, 6 Drawing Sheets

(58) Field of Classification Search
USPC .......................................................... 705/337
See application file for complete search history.

(56) References Cited

U.S. PATENT DOCUMENTS

| | | |
|---|---|---|
| 7,385,529 B2 | 6/2008 | Hersh |
| 7,761,348 B2 | 7/2010 | Amling |
| 10,282,694 B2 | 5/2019 | Jones |
| 10,671,961 B2 | 6/2020 | Cao |
| 2002/0188530 A1* | 12/2002 | Wojcik ................... G06Q 30/04 705/28 |
| 2005/0278063 A1 | 12/2005 | Hersh |
| 2006/0265234 A1* | 11/2006 | Peterkofsky ........... G06Q 10/08 705/7.11 |
| 2010/0017273 A1 | 1/2010 | Hommrich |
| 2016/0364823 A1 | 12/2016 | Cao |
| 2017/0046658 A1* | 2/2017 | Jones ................. G06Q 10/0835 |
| 2017/0148125 A1 | 5/2017 | Ericksrud |
| 2018/0094953 A1 | 4/2018 | Colson |
| 2018/0211218 A1* | 7/2018 | Berdinis .......... G06Q 10/08355 |
| 2021/0182790 A1 | 6/2021 | Saenz et al. |

FOREIGN PATENT DOCUMENTS

| | | | |
|---|---|---|---|
| WO | WO-2010123513 A1 * | 10/2010 | ........... G06Q 10/087 |
| WO | 2018072040 A1 | 4/2018 | |
| WO | 2018106730 A1 | 6/2018 | |

OTHER PUBLICATIONS

U.S. Appl. No. 17/116,696, filed Dec. 9, 2020.

* cited by examiner

METHODS AND SYSTEMS FOR OPTIMIZING THE POOLING AND SHIPPING OF FREIGHT

CROSS-REFERENCE TO RELATED APPLICATIONS

This application claims priority from U.S. Provisional Patent Application No. 62/948,157, filed on Dec. 13, 2019, entitled "Methods and Systems for Optimizing the Pooling and Shipping of Freight," which is hereby incorporated by reference.

BACKGROUND

The disclosure relates to methods for shipping freight. More particularly, the methods and systems described herein relate to functionality for pooling shipments of goods transported by land (e.g., via vehicles such as trucks).

Conventionally, shippers and carriers categorize shipments of freight as full truckloads of freight, partial truckloads of freight, or less than full truckloads of freight. Conventionally, full truckloads of freight refer to shipments that typically occupy more than half of the full capacity of a 48' or 53' trailer (e.g., over 24 linear feet and between 5,000 and 44,000 pounds); less than full truckloads of freight conventionally refer to shipments of up to six pallets (e.g., 12 linear feet) and up to 5,000 pounds; and partial truckloads of freight refers to anything larger than a less than full truckload and less than a full truckload of freight, typically ranging from six to 18 pallets (12 to 36 linear feet) and 5,000 to 27,500 pounds.

Typically, shippers of full truckloads of freight are provided with service level guarantees regarding when the carrier (e.g., the operator of the truck) will pick up the shipper's shipments and when the carrier will deliver the shipment. However, such guarantees are typically not available to shippers of less than full truckloads of freight. Carriers for less than full truckloads and those willing to ship partial truckloads typically employ a hub and spoke model; for example, a first truck may pick up a shipment and deliver it to a warehouse in the carrier's network where the shipment will be stored until a second truck traveling in the direction of the shipment's destination and having room for the shipment arrives at the warehouse (or is already at the warehouse and waiting to be filled with freight to be moved to another warehouse), picks up the shipment, and delivers it to yet another warehouse where the process iterates until the shipment is delivered. Each transition from a truck to a warehouse (and from a warehouse to a truck) increases the risk of damage to the shipment and slows down the shipping process. Although there are conventional brokers who can assist shippers, such brokers do not typically provide any service level guarantees for any mode of shipping other than full truckload shipping. Therefore, there is a need to address challenges facing shippers of partial and less than full truckloads of freight.

BRIEF DESCRIPTION

In one aspect, a method for pooling a plurality of shipments of less than full truckloads of freight to create a full truckload with an optimized loading order and delivery route satisfying at least one scheduling requirement for each of the plurality of shipments and providing a service level guarantee for each of the plurality of shipments, includes receiving a request from a first shipper for delivery of a first shipment of less than a full truckload of freight between an origin and a destination by a specified delivery date in accordance with a level of service guaranteed for a full truckload of freight. The method includes determining a first price for shipping the shipment according to a first rate for shipping the less than the full truckload of freight between the origin and the destination by the specified delivery date. The method includes determining a second price for shipping the shipment according to a second rate for shipping a full truckload of freight between the origin and the destination by the specified delivery date. The method includes providing a commitment to ship the shipment for the first shipper between the origin and the destination by the specified delivery date in accordance with the level of service guaranteed for the full truckload of freight at a third price that is lower than at least the second price. The method includes receiving, after providing the commitment to ship the shipment for the first shipper, a request from a second shipper for delivery of a second shipment of less than a full truckload of freight between the origin and the destination by the specified delivery date. The method includes determining, by a solver executing on a computing device, to combine the first shipment and the second shipment into a full truckload of freight. The method includes generating, by the solver, a route and a schedule for picking up the first shipment and the second shipment that comply with the service level guaranteed and result in delivery of each of the first shipment and the second shipment by the specified delivery date. The method includes directing a carrier of full truckloads of freight to execute the schedule for picking up the first shipment of less than the full truckload of freight and the second shipment of less than the full truckload of freight and to follow the identified route to deliver each of the first shipment and the second shipment by the specified delivery date.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
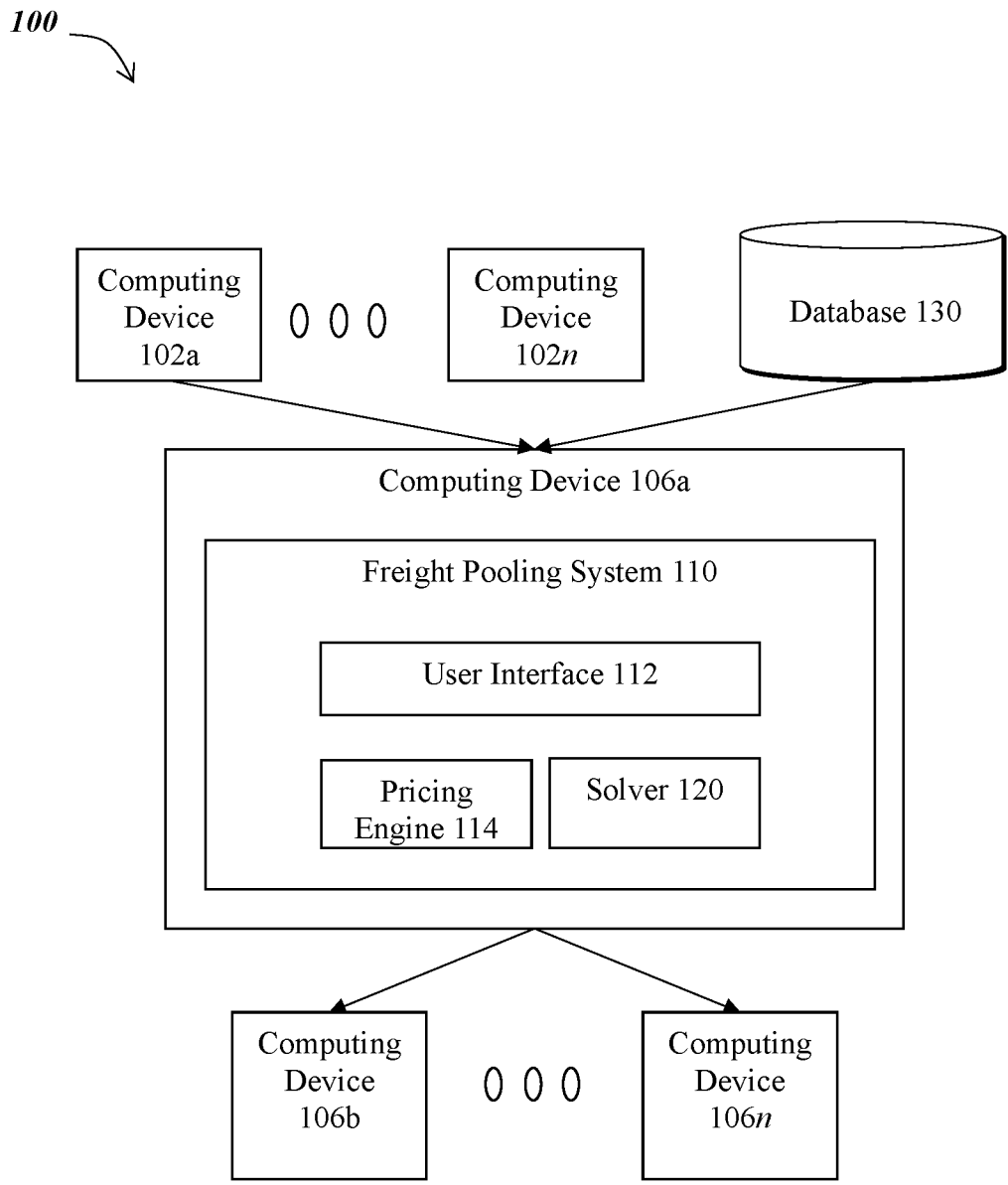
FIG. 1 is a block diagram depicting an embodiment of a system for optimizing the pooling and shipping of freight.

The methods and systems described herein may provide functionality for optimizing the pooling and shipping of freight. The methods and systems described herein may provide functionality to address the needs of shippers (who require reliable pick-ups, on-time deliveries, and/or undamaged goods, at the lowest price) while also addressing the needs of freight carriers (who seek to maximize utilization of trucks, to minimize idle time, and to optimize routes while getting the highest price for their services). As will be understood by those of ordinary skill in the art, carriers may be owners and/or operators of fleets of trucks of the for-hire full truckload market; shippers may be anyone shipping less than full truckloads of freight. In contrast to conventional systems, in which shippers who require on-time deliveries and/or undamaged goods and/or had to control other aspects of the shipping process had to pay for a full truck even for shipments of freight that would not fill the truck, the methods and systems described herein provide functionality allowing such shippers to ship less than full truckloads of freight at prices less than the prices for full truckloads of freight while receiving the service level guarantees that conventionally are only provided by full truckload carriers. By using the methods and systems described herein, combining shipments of less than full truckloads of freight with other shipments of partial or less than full truckloads of freight (or combining partial shipments with each other) allows for the generation by the system of a single packing order and pickup and delivery route for a truck driver to follow in a particular sequence without having to stop at a warehouse, as it otherwise would in a hub-and-spoke system, providing the shipper with a higher degree of precision regarding the schedule and faster transit time (especially with longer routes) while minimizing the likelihood of damage (which is more likely when the carrier has to unload freight from the truck and load it into a warehouse and then unload it from the warehouse and then reload it on to another truck). Additionally, by using the methods and systems described herein, carriers may have a more optimal use of their assets (e.g., more freight on more full trucks) with the resulting additional revenue.

As will be described in greater detail below, the methods and systems described herein provide functionality for receiving requests for shipments of less than full truckloads of freight and identifies a pooling arrangement in which a shipper of less than a full truckload of freight receives the service level guarantees typically provided to shippers of full truckloads of freight because the system can execute a method that identifies different shipping requests that should be pooled together for shipping. One factor enabling this method is re-definition of the conventional terms "full truckload" and "less than full truckload". As described herein, a "full truckload" refers to a shipment that is greater than 48 linear feet or 40,000 lbs. Similarly, as described herein, "less than a full truckload" refers to anything less than or equal to 48 linear feet or 40,000 lbs. Additionally, as described herein, "less than a full truckload" may encompass shipments that are conventionally referred to as partial shipments.

Referring now to FIG. 1, a block diagram depicts one embodiment of a system for optimizing the pooling and shipping of freight. In brief overview, the system 100 includes computing devices 102a-n, computing devices 106a-n, a freight pooling system 110, a user interface 112, a pricing engine 114, a solver 120, and a database 130. The computing devices 106a-n may be a modified type or form of computing device (as described in greater detail below in connection with FIGS. 4A-C) that have been modified to execute instructions for providing the functionality described herein; these modifications result in a new type of computing device that provides a technical solution to problems rooted in computer technology, such as the receiving of shipping requests over a computer network, execution of software applications that optimize the servicing of those requests in real-time (e.g., at or substantially at the same time as requests are received), and transmission of routes for picking up and delivering a plurality of shipments by one or more carriers for a plurality of shippers.

The freight pooling system 110 may be provided as a software component. The freight pooling system 110 may be provided as a hardware component. The computing device 106a may execute the freight pooling system 110. The freight pooling system 110 may be in communication with the computing device 102. The freight pooling system 110 may be in communication with the database 130. In some embodiments, the freight pooling system 110 may include the database 130 (not shown).

The freight pooling system 110 may include functionality for optimizing the pooling and shipping of freight.

The user interface 112 may be provided as a hardware component. The user interface 112 may be provided as a software component. The computing device 106a may execute the user interface 112. The user interface 112 may be in communication, directly or indirectly, with the computing device 102.

The user interface 112 may include functionality for directing the display of a user interface on the computing device 102 (e.g., the computing device 106 provides the functionality of a server and the user interface 112 directs the communication with the computing device 102 that provides the user interface information for display to a user of the computing device 102). The user interface 112 may include functionality for receiving, directly or indirectly, user input provided to the computing device 102, such as, for example and without limitation, user input relating to a shipment (such as, without limitation, pickup and delivery dates and times, origin and destination locations, and details regarding the freight to be shipped). Unlike conventional interfaces for making shipping requests, the user interface 112 does not require a user to specify whether they wish to ship by conventional less than full truckload carrier, conventional full truck carrier, or partial carrier; the user interface simply receives shipping details (number of pallets, dimensions, weight, contents, scheduling/time constraints, destination and origin addresses) and displays a price at which the shipment can be completed. The user interface 112 may be in communication with the solver 120 to receive the price. The user interface 112 may display multiple options (higher costs for less flexibility regarding pickup date/time or other such factors, lower costs for more flexibility regarding pickup date/time or other such factors) and receive user input specifying an option.

The user interface 112 may include functionality for directing the display of a user interface on the computing device 106b (e.g., the computing device 106a provides the functionality of a server and the user interface 112 directs the communication with the computing device 106b that provides the user interface information for display to a user of the computing device 106b). The user interface 112 may include functionality for receiving, directly or indirectly, user input provided to the computing device 106b, such as, for example and without limitation, user input relating to shipping rates or prices. In an embodiment in which rates and/or prices are determined automatically, the user interface 112 may provide functionality (e.g., user interface elements) with which a user may override the determined rates and/or prices.

The pricing engine 114 may be provided as a hardware component. The pricing engine 114 may be provided as a software component. The computing device 106 may execute the pricing engine 114. The pricing engine 114 may determine the rates for shipping via a plurality of modalities (e.g., less than full truckload, partial truckload, and full truckload). The pricing engine 114 may determine the prices to charge shippers for shipping. The pricing engine 114 may include functionality for executing application programming interface (API) calls to one or more less than full truckload carriers to request and receive automated rates for one or more shipments. The pricing engine 114 may include functionality for receiving rate estimates from full truckload rate providers. The pricing engine 114 may include functionality for receiving (either via user input or via an automated system) data identifying average rates for full truckloads and/or identifying high/middle/low end rates for full truckloads, in various markets and/or in various lanes (as will be understood by those of ordinary skill in the art, a lane is a directed origin/destination pair), from which the pricing engine 114 may determine a rate that the system 100 will incur in shipping via full truckload carriers and then a price to charge the shipper. The pricing engine 114 may include functionality for receiving (either via user input or via an automated system) data for use in forecasting rates in one or more markets. The pricing engine 114 may include functionality for receiving (either via user input or via an automated system) data for use in forecasting rates in one or more lanes. The pricing engine 114 may include functionality for adjusting rates based on internal or external rate forecasts. The pricing engine 114 may include functionality receiving data associated with at least one weather forecast, for use in determining pricing.

The pricing engine 114 may derive an estimated (e.g., pro-rated) rate for shipping a partial truckload of freight by using data received from full truckload rate providers and derive a price to charge the shipper based on the estimated rate. The pricing engine 114 may derive an estimated (e.g., pro-rated) rate for shipping a partial truckload of freight by using stored data identifying historical truckload rates (e.g., rates actually paid for previous shipments) and derive a price to charge the shipper based on the estimated rate. The pricing engine 114 may derive an estimated (e.g., pro-rated) rate for shipping a partial truckload of freight by using an analytical model including a plurality of parameters, including but not limited to market-based parameters, haul-length based parameters, and lane-based parameters and derive a price to charge the shipper.

The solver 120 may be provided as a hardware component. The solver 120 may be provided as a software component. The computing device 106 may execute the solver 120. The solver 120 may be in communication with the database 130. The solver 120 may include or be in communication with the pricing engine 114.

The freight pooling system 110 may include or be in communication with the database 130. The database 130 may store data related to the pooling and shipping of freight. For example, the database 130 may store data related to received shipping requests. As another example, the database 130 may store data related to shipments that were previously pooled together and with associated shipment data, such as requested pickup and delivery dates and times and actual pickup and delivery dates and times. In some embodiments, the database 130 is an ODBC-compliant database. For example, the database 130 may be provided as an ORACLE database, manufactured by Oracle Corporation of Redwood Shores, Calif. In other embodiments, the database 130 can be a Microsoft ACCESS database or a Microsoft SQL server database, manufactured by Microsoft Corporation of Redmond, Wash. In other embodiments, the database 130 can be a SQLite database distributed by Hwaci of Charlotte, N.C., or a PostgreSQL database distributed by The PostgreSQL Global Development Group. In still other embodiments, the database 130 may be a custom-designed database based on an open source database, such as the MYSQL family of freely available database products distributed by Oracle Corporation of Redwood City, Calif. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc., of New York, N.Y., an AWS DynamoDB distributed by Amazon Web Services and Cassandra databases distributed by The Apache Software Foundation of Forest Hill, Md. In further embodiments, the database 130 may be any form or type of database.

Although, for ease of discussion, the freight pooling system 110, the user interface 112, the solver 120, and the database 130 are described in FIG. 1 as separate modules, it should be understood that this does not restrict the architecture to a particular implementation. For instance, these components may be encompassed by a single circuit or software function or, alternatively, distributed across a plurality of computing devices.

Figure 2:
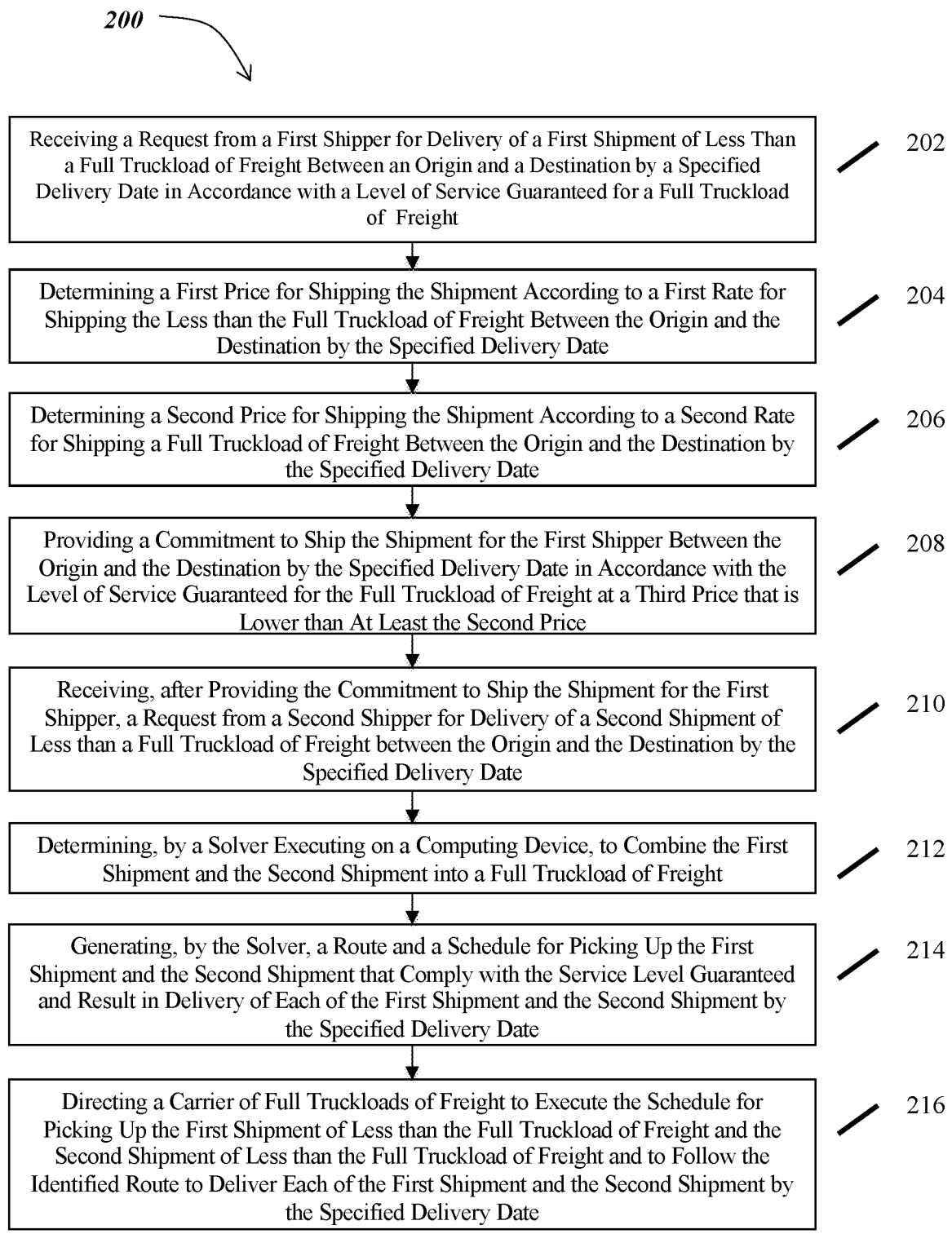
FIG. 2 is a flow diagram depicting an embodiment of a method for optimizing the pooling and shipping of freight.

Referring now to FIG. 2, in brief overview, a block diagram depicts one embodiment of a method 200 for pooling a plurality of shipments of less than full truckloads of freight to create a full truckload with an optimized loading order and delivery route satisfying at least one scheduling requirement for each of the plurality of shipments and providing a service level guarantee for each of the plurality of shipments. The method 200 includes receiving a request from a first shipper for delivery of a first shipment of less than a full truckload of freight between an origin and a destination by a specified delivery date in accordance with a level of service guaranteed for a full truckload of freight (202). The method 200 includes determining a first price for shipping the shipment according to a first rate for shipping the less than the full truckload of freight between the origin and the destination by the specified delivery date (204). The method 200 includes determining a second price for shipping the shipment according to a second rate for shipping a full truckload of freight between the origin and the destination by the specified delivery date (206). The method 200 includes providing a commitment to ship the shipment for the first shipper between the origin and the destination by the specified delivery date in accordance with the level of service guaranteed for the full truckload of freight at a third price that is lower than at least the second price (208). The method 200 includes receiving, after providing the commitment to ship the shipment for the first shipper, a request from a second shipper for delivery of a second shipment of less than a full truckload of freight between the origin and the destination by the specified delivery date (210). The method 200 includes determining, by a solver executing on a computing device, to combine the first shipment and the second shipment into a full truckload of freight (212). The method 200 includes generating, by the solver, a route and a schedule for picking up the first shipment and the second shipment that comply with the service level guaranteed and result in delivery of each of the first shipment and the second shipment by the specified delivery date (214). The method 200 includes directing a carrier of full truckloads of freight to execute the schedule for picking up the first shipment of less than the full truckload of freight and the second shipment of less than the full truckload of freight and to follow the identified route to deliver each of the first shipment and the second shipment by the specified delivery date (216).

In the method 200 for pooling a plurality of shipments of less than full truckloads of freight to create a full truckload with an optimized loading order and delivery route satisfying at least one scheduling requirement for each of the plurality of shipments and providing a service level guarantee for each of the plurality of shipments, scheduling requirements may include pickup date, pickup time, delivery date, delivery time, origin, and destination. In some embodiments, a subset of a shipper's scheduling requirements is satisfied—for example, a shipper may be willing to be flexible about a pickup date and time as long as origin, destination, delivery date, and delivery time are all satisfied or if there is a financial incentive for being flexible. In other embodiments, all of the shipper's scheduling requirements are satisfied.

Referring now to FIG. 2, in greater detail and in connection with FIG. 1, the method 200 includes receiving a request from a first shipper for delivery of a first shipment of less than a full truckload of freight between an origin and a destination by a specified delivery date in accordance with a level of service guaranteed for a full truckload of freight (202). The user interface 112 may receive, from the computing device 102a, the request from the first shipper. The request may include a specified pickup location (if the pickup location differs from the origin). The request may include a specified pickup location. The origin may be the same as the pickup location. The origin may be different than the pickup location. The request may include a specified pickup date. The request may include a specified pickup time (e.g., for picking up the shipment from the origin). The request may include a specified delivery date. The request may include a specified delivery time.

The method 200 includes determining a first price for shipping the shipment according to a first rate for shipping the less than the full truckload of freight between the origin and the destination by the specified delivery date (204). The pricing engine 114 may determine the first price. In one embodiment, the system 100 provides functionality for requesting rates from less than full truckload carriers. In another embodiment, the system 100 provides functionality for requesting rates from full truckload carriers who are willing to ship less than full truckload shipments (e.g., partial shipments). In still another embodiment, the system 200 provides functionality for requesting rates from a plurality of carriers, each of whom may provide either less than full truckload shipment services or partial shipment services or both. The system 100 may execute functionality to receive a rate and determine a price to quote to the shipper; the price may be higher or lower than the rate. Therefore, the method 200 may include receiving the first rate from a less than full truckload carrier. The method 200 may include receiving the first rate from a partial truckload carrier (including from a full truckload carrier who is willing to ship partial truckload shipments). The method 200 may include overlaying pricing logic to determine whether to mark a rate up or down in generating the price for the shipper. The method 200 may include analyzing the probability of pooling other shipments with a particular shipment, based on, without limitation, densities for shipping lanes (which might suggest whether to take more or less risk) and arbitrage between shipping modes. For example, in a lane for shipping a full truckload from Los Angeles to San Francisco, the going rate may be $1,000 while the cost of less than full truckload shipping for five pallets is $600; if the solver 120 can pool together five shipments of five pallets each at $600 each, each individual shipper is paying $400 less than they would have for full truckload shipping and the same price as they would have paid for less than full truckload shipping while receiving full truckload shipping service level guarantees while the revenue received is three times more than what is needed for the full truckload shipping. To implement this method and determine the price to charge a particular shipper, the system 100 executes the method 200 to assess the density of shipping requests in an area (e.g., whether there are enough shippers of five pallets between Los Angeles and San Francisco) and assess a likely percentage of shipping acceptances and assess the probability of opportunities to pool and perform arbitrage; the system 100 may then determine pricing markups/markdowns and store for access by the pricing engine 114 (e.g., in the database 130). The system 100 may also take into consideration current events that may impact shipping (e.g., detours and road closures related to wildfires or inclement weather).

In some embodiments, the rates received for less than full truckload shipments are such that it would not be cost competitive in all cases to pool shipments. Therefore, in some embodiments, the pricing is based on partial cost estimates with the price marked down based on received data points. In some embodiments, the rate that is received is for partial shipping, which may or may not provide the same revenue incentive for the system 100 (e.g., fewer opportunities for arbitrage) but which guarantee a particular delivery date.

The method 200 includes determining a second price for shipping the shipment according to a second rate for shipping a full truckload of freight between the origin and the destination by the specified delivery date (206). The pricing engine 114 may determine the second price. In one embodiment, the system 100 provides functionality for requesting rates from full truckload carriers. The system 100 may execute functionality to receive a rate and determine a price to quote to the shipper; the price may be higher or lower than the rate. The system 100 may determine an estimated second rate for shipping the full truckload of freight between the origin and the destination by the specified delivery date. The system 100 may retrieve data from a rating service that provides aggregated average rate data for shipping via full truckload carriers; the system may then determine an estimated rate to ship a full truckload. In some embodiments, the system 100 receives (either directly or indirectly) actual rates from full truckload carriers but does not use those rates to determine rate or price, using them instead to adjust models used by the pricing engine 114 to determine cost estimates and pricing markups or pricing markdowns.

Therefore, the pricing engine 114 may use the costs to determine the pricing offered to the shipper and the method 200 may include providing different commitments and different prices to different shippers. As an example, the first shipper may indicate in the request that the first shipper wants a shipment sent directly from an origin to a destination, without reliance on a hub-and-spoke shipping system, and with certain service level guarantees. A second shipper may indicate in the request that the second shipper is willing to accept a conventional shipping method for a lower cost. If the system 100 identifies another shipment with which a shipment can be combined and shipped in a more efficient manner (e.g., without utilizing the hub-and-spoke model), as will be described in greater detail below, the system 100 may execute the method 200 to combine multiple shipments, regardless of what guarantees were provided to the shippers.

The method 200 includes providing a commitment to ship the shipment for the first shipper between the origin and the destination by the specified delivery date in accordance with the level of service guaranteed for the full truckload of freight at a third price that is lower than at least the second price (208). In some embodiments, the commitment is a commitment to ship the shipment for the first shipper between the origin and the destination by the specified date in accordance with the level of service guaranteed for the full truckload of freight at the third price that is lower than the first price and the second price. The system 100 may update the user interface 112 to display the terms and conditions accepted by the shipper and by the system 100 (e.g., price, origin, destination, delivery date/time, pickup date/time, and so on). The level of service guaranteed may guarantee the first shipper that the shipment will arrive on the specified delivery date. The level of service guaranteed may identify a type of compensation for the first shipper in the event that the level of service is not met (e.g., a money-back guarantee). The level of service guaranteed may guarantee the first shipper that the shipment will arrive undamaged. The level of service guaranteed may guarantee the first shipper that the shipment will include weekend transit. The level of service guaranteed may guarantee the first shipper that the shipment will arrive without a terminal transfer. The level of service guaranteed may guarantee the first shipper that the shipment will be shipped with a faster transit time than conventional. The level of service guaranteed may guarantee the first shipper that the shipment will arrive without extra fees (e.g., re-weigh, oversize, re-class, insurance, etc.). In some embodiments, the level of service is guaranteed even if the shipment is not combined with another shipment.

The method 200 includes receiving, after providing the commitment to ship the shipment for the first shipper, a request from a second shipper for delivery of a second shipment of less than a full truckload of freight between the origin and the destination by the specified delivery date (210). The request from the second shipper may be received in the manner that the request from the first shipper was received, as described above in connection with (202). The request from the second shipper may include a specified pickup location. The request from the second shipper may include a specified pickup date. The request from the second shipper may include a specified pickup time. The request from the second shipper may include a specified delivery date. The request from the second shipper may include a specified delivery time.

The method 200 may include providing a commitment to ship the shipment for the second shipper between the origin and the destination by the specified date in accordance with the level of service guaranteed for the full truckload of freight at a fourth price that is lower than at least the second price. The first and second shippers may receive the same price. The first and second shippers may receive different prices.

The solver 120 makes the determination to combine the shipments after at least the first shipper has received a commitment for shipment of the freight according to certain terms (and, in some embodiments, after the second shipper has received a similar commitment). Therefore, in some embodiments, before the solver 120 determines to combine the first shipment and the second shipment, and before the system 100 receives the second shipment request, the solver 120 determines a level of probability of receiving the request from the second shipper for delivery of the second shipment of less than full truckloads of freight between the origin and the destination by the specified date.

The solver 120 may continuously run on all shipments that have been ordered so far, identifying an optimal pooling strategy across all shipments.

The method 200 includes determining, by a solver executing on a computing device, to combine the first shipment and the second shipment into a full truckload of freight (212).

The solver 120 may receive any number of shipments from any number of shippers during a given time period (for example, thousands of shipments from hundreds of shippers during a week) and determine an optimal set of combinations (e.g., pools), each of which satisfy delivery dates, service level guarantees, truck constraints, scheduling constraints, and shipping constraints, and may do so at the lowest overall cost compared to shipping the shipments individually (e.g., unpooled). The solver 120 may also optimize for fulfillment risk, carrier preference, and other overall "route health" characteristics.

The solver 120 may determine that the first shipment and the second shipment could be combined while still satisfying the specified delivery date. The solver 120 may determine that the first shipment and the second shipment could be combined while still satisfying the specified delivery date and meeting the service level guarantees made to each of the first shipper and the second shipper. The solver 120 may determine that the first shipment and the second shipment could be combined while still satisfying the specified delivery date and satisfying at least one scheduling constraint; for example, scheduling constraints may include, without limitation, appointment windows, location dock hours of availability, waiting time at each stop, regulatory and/or practical hours of service by drivers (hours per day, mandatory breaks, etc.). The solver 120 may determine that the first shipment and the second shipment could be combined while still satisfying the specified delivery date and meeting at least one shipping compatibility constraint; for example, a product that requires refrigeration during shipping could not be combined with a product that does not require refrigeration (or a product that cannot be refrigerated) since the product that requires refrigeration needs to be shipped in a refrigerated truck, which the other product does not need. As another example, the solver 120 may ensure that a shipment that includes hazardous materials is not combined with a shipment that includes food or perishables where constraints of each shipment would prohibit such a combination. The solver 120 may determine that the first shipment and the second shipment could be combined while still satisfying the specified delivery date and meeting at least one shipping vehicle constraint; for example, and without limitation, a vehicle may have weight limits, space limits, and packing constraints (such as stacking heights, etc.).

As indicated above, the solver 120 may determine that the first shipment and the second shipment could be combined into a full truckload of freight while still satisfying the specified delivery date and meeting any other constraints associated with the shipments. To do this, the solver 120 may take into consideration route length (which may depend upon shipment sequence), a number of stops during a shipment, market rates between all possible origins and all possible destinations. The solver 120 may assign (either explicitly or implicitly) probabilities to lists of shipments based on a set of shipment features (pickup location, unpooled cost, etc.). The solver 120 may establish (either explicitly or implicitly) transition probabilities between shipment lists and sets of shipment lists based on features and order of the constituent shipments. The solver 120 may repeatedly sample a list of shipments using a combination of the probabilities, and assess feasibility and utility of fulfilling the constituent shipments via a pool fulfilling the shipments in the specified ordering. The solver 120 may select a shipment-disjoint set of identified pools which maximize utility (broadly defined as incorporating cost, execution risk, and other such factors).

In some embodiments, the solver 120 may identify a combination of two or more shipments that exceeds a level of cost savings as compared with not combining the two or more shipments or as compared with combining any one of those shipments with a different set of shipments; as an example, the solver 120 may determine that it is economical to combine shipments one and two but not to combine shipments three and four with anything else. Therefore, the method 200 includes determining, by the solver 120, that combining the first shipment and the second shipment exceeds a level of cost savings provided by combining the first shipment with a third shipment requested by a third shipper for delivery of a third shipment of less than full truckloads of freight between the origin and the destination by the specified date.

The solver 120 may continuously execute as new shipping requests are received and confirmed. Therefore, as new shipment requests are received, the solver 120 may modify existing combinations. For example, the method 300 may include receiving, after providing the commitment to ship the shipment for the first shipper and after determining to combine the first shipment and the second shipment and before shipment of the combined first shipment and second shipment, a request for a third shipment requested by a third shipper for delivery of a third shipment of less than the full truckload of freight between the origin and the destination by the specified date; the solver may then determine to combine the first shipment and the third shipment instead of the first shipment and the second shipment. As another example, the method 200 may include receiving, after providing the commitment to ship the shipment for the first shipper and after determining to combine the first shipment and the second shipment and before shipment of the combined first shipment and second shipment, a request for a third shipment requested by a third shipper for delivery of a third shipment of less than the full truckload of freight between the origin and the destination by the specified date; the solver 120 may then determine to combine the first shipment, the second shipment, and the third shipment into a full truckload of freight shipped by a single truck. Although described herein as three shipments, there may be any number (e.g. hundreds or thousands) of shipment requests received at any one point in time and the solver 120 may continuously re-evaluate which of those shipments to combine with other shipments. In some embodiments, the solver 120 may access a data structure indicating whether a pool has been marked as "covered" indicating that the system 100 has hired a carrier to move the combined shipments; at this point, the pool is considered "locked" (unless later uncovered) and no additional refinement of that pool will occur. Similarly, the solver 120 will not re-evaluate any shipments marked "in transit" or otherwise marked as having been shipped and a carrier having picked up the shipment.

The method 200 includes generating, by the solver, a route and a schedule for picking up the first shipment and the second shipment that comply with the service level guaranteed and result in delivery of each of the first shipment and the second shipment by the specified delivery date (214). Given the number of shipments, the number of constraints for each of the shipments, and the number of new requests for shipping being received, the solver 120 evaluates a combinatorial explosion of possible options to identify an optimal set of shipment combinations (pools), to generate the schedule for picking up shipments (and thus for loading trucks) and to generate the route for delivering the shipments. Unlike human-based brokerages or conventional software for managing a single shipper's shipments, the solver 120 can manage receiving thousands of shipments a day from a plurality of different shippers and evaluate tens to hundreds of thousands of possible pools (e.g. just 200 shipments could result in 30,000-50,000 possible pools) to identify the optimal set of combinations of shipments, to generate the schedule for picking up shipments and to generate the route for delivering each of the combined shipments (pools).

In some embodiments, the solver 120 provides a recommended combination of shipments and the generated schedule and the generated route to a human for review and, upon receiving user input representing feedback from the review, the solver 120 may modify the recommended combination of shipments and the generated schedule and the generated route. The solver 120 may maintain a record (e.g., in a database) of user input providing feedback and refer to the record when generating subsequent recommendations.

The method 200 includes directing a carrier of full truckloads of freight to execute the schedule for picking up the first shipment of less than the full truckload of freight and the second shipment of less than the full truckload of freight and to follow the identified route to deliver each of the first shipment and the second shipment by the specified delivery date (216). The carrier may be a third-party carrier who owns and/or operates a truck that can be hired to ship the shipments. The carrier may be the same entity that owns and/or maintains the system 100.

In some embodiments, as described above, the first shipper and the second shipper may request shipments having the same or substantially similar delivery dates, origins, and destinations. In other embodiments, however, one or more of those factors (delivery date, origin, and destination) as well as other factors (e.g., pickup date or pickup time) may vary. Therefore, and referring now to FIG. 3, a flow diagram depicts a method 300 for pooling a plurality of shipments of less than full truckloads of freight to create a full truckload with an optimized loading order and delivery route satisfying at least one scheduling requirement for each of the plurality of shipments and providing a service level guarantee for each of the plurality of shipments. In brief overview, the method 300 includes receiving a request from a first shipper for delivery of a first shipment of less than a full truckload of freight between a first origin and a first destination by a first specified delivery date in accordance with a level of service guaranteed for a full truckload of freight (302). The method 300 includes determining a first price for shipping the shipment according to a first rate for shipping the less than the full truckload of freight between the first origin and the first destination by the first specified delivery date (304). The method 300 includes determining a second price for shipping the shipment according to a second rate for shipping a full truckload of freight between the first origin and the first destination by the first specified delivery date (306). The method 300 includes providing a first commitment to ship the shipment for the first shipper between the first origin and the first destination by the first specified delivery date in accordance with the level of service guaranteed for the full truckload of freight at a third price that is lower than at least the second price (308). The method 300 includes receiving, after providing the commitment to ship the shipment for the first shipper, a request from a second shipper for delivery of a second shipment of less than full truckloads of freight between a second origin and a second destination by a second specified delivery date (310). The method 300 includes providing a commitment to ship the second shipment for the second shipper between the second origin and the second destination by the second specified delivery date in accordance with the level of service guaranteed for the full truckload of freight at a fourth price (312). The method 300 includes determining, by a solver executing on a computing device, to combine the first shipment and the second shipment into a full truckload of freight (314). The method 300 includes generating, by the solver, a route and a schedule for picking up the first shipment and the second shipment that comply with the service level guaranteed and result in delivery of each of the first shipment and the second shipment by each of the first specified delivery date and the second specified delivery date (316). The method 300 includes directing a carrier of full truckloads of freight to execute the schedule for picking up the first shipment of less than the full truckload of freight and the second shipment of less than the full truckload of freight and to follow the generated route to deliver each of the first shipment and the second shipment by each of the first specified delivery date and the second specified delivery date (318).

Figure 3:
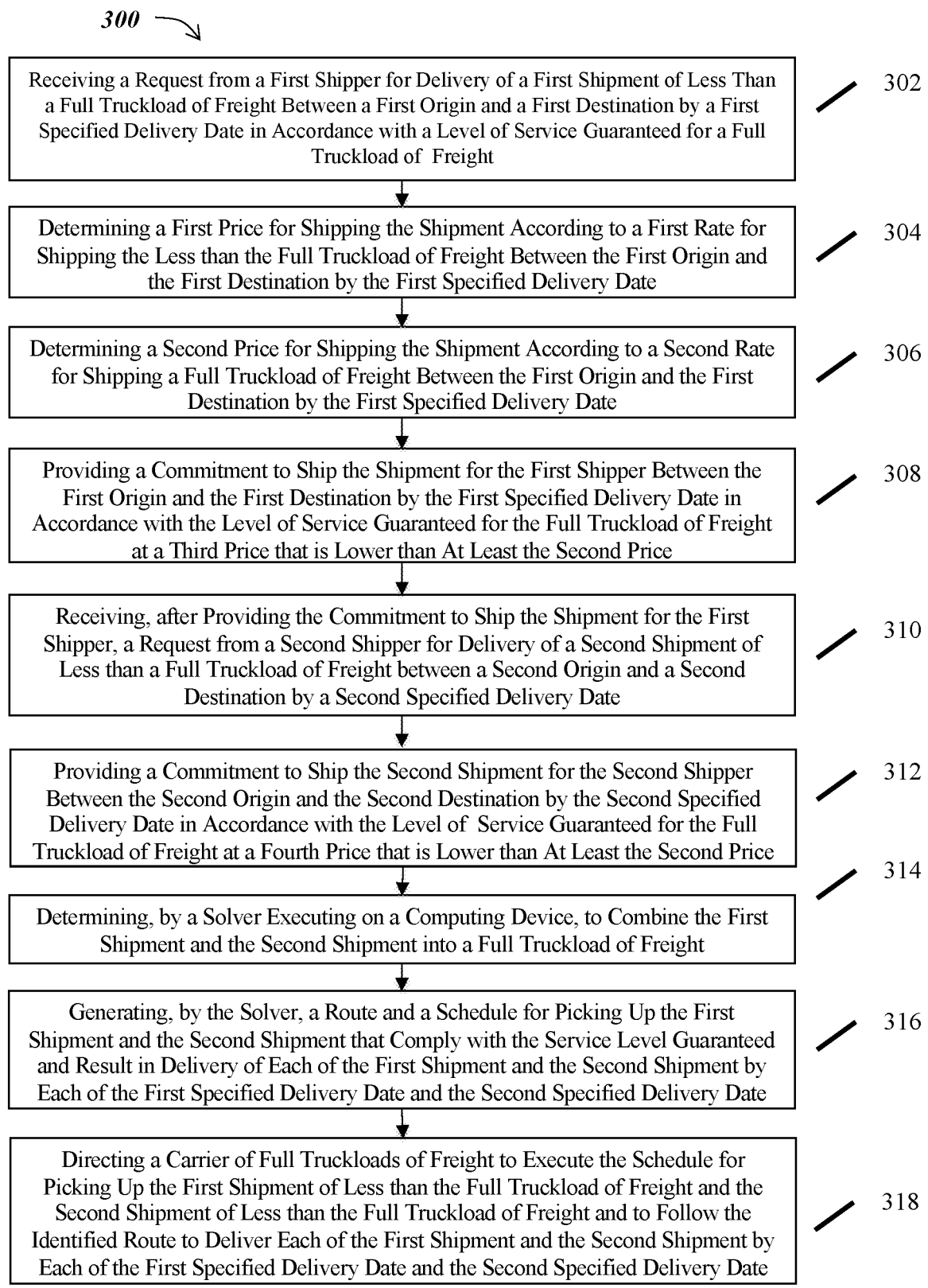
FIG. 3 is a flow diagram depicting an embodiment of a method for optimizing the pooling and shipping of freight.

Referring now to FIG. 3, in greater detail and in connection with FIGS. 1-2, the method 300 includes receiving a request from a first shipper for delivery of a first shipment of less than a full truckload of freight between a first origin and a first destination by a first specified delivery date in accordance with a level of service guaranteed for a full truckload of freight (302). The method 300 includes determining a first price for shipping the shipment according to a first rate for shipping the less than the full truckload of freight between the first origin and the first destination by the first specified delivery date (304). The method 300 includes determining a second price for shipping the shipment according to a second rate for shipping a full truckload of freight between the first origin and the first destination by the first specified delivery date (306). The method 300 includes providing a first commitment to ship the shipment for the first shipper between the first origin and the first destination by the first specified delivery date in accordance with the level of service guaranteed for the full truckload of freight at a third price that is lower than at least the second price (308). The method 300 includes receiving, after providing the commitment to ship the shipment for the first shipper, a request from a second shipper for delivery of a second shipment of less than full truckloads of freight between a second origin and a second destination by a second specified delivery date (310). In some embodiments, the system 100 may execute (302), (304), (306), (308), and (310) as described above in connection with FIGS. 2 (202), (204), (206), (208), and (210).

The method 300 includes providing a commitment to ship the second shipment for the second shipper between the second origin and the second destination by the second specified delivery date in accordance with the level of service guaranteed for the full truckload of freight at a fourth price (312). The pricing engine 114 may determine, prior to the providing of the commitment, a fifth price for shipping the second shipment according to a third rate for shipping the less than the full truckload of freight between the second origin and the second destination by the second delivery date. The pricing engine 114 may determine, prior to the providing of the commitment, a sixth price for shipping the second shipment according to a fourth rate for shipping a full truckload of freight between the second origin and the second destination by the second specified delivery date. The fourth price may be lower than the sixth price. The fourth price may be lower than the fifth price and lower than the sixth price.

The method 300 includes determining, by a solver executing on a computing device, to combine the first shipment and the second shipment into a full truckload of freight (314). The method 300 includes generating, by the solver, a route and a schedule for picking up the first shipment and the second shipment that comply with the service level guaranteed and result in delivery of each of the first shipment and the second shipment by each of the first specified delivery date and the second specified delivery date (316). The method 300 includes directing a carrier of full truckloads of freight to execute the schedule for picking up the first shipment of less than the full truckload of freight and the second shipment of less than the full truckload of freight and to follow the generated route to deliver each of the first shipment and the second shipment by each of the first specified delivery date and the second specified delivery date (318). In some embodiments, the system 100 may execute (314), (316), and (318) in the same manner as described above in connection with FIGS. 2, (212), (214), and (216).

As indicated above, the shipping request of the first shipper and the shipping request of the second shipper may have the same or different pickup date, pickup time, destination date, destination time, origin, destination, shipment size/dimensions (e.g., number of packages, linear feet, and weight), type of goods, and other shipping requirements; the solver 120 may consider each of these factors in determining whether to combine two shipments. The solver 120 may consider a variety of thresholds and/or constraints when determining whether to combine two or more shipments. For example, a threshold may be a function of whether a combination of two or more shipments would achieve a particular level of cost savings (e.g., whether it makes economic sense to combine two or more shipments). Each set of shipments ("pools") may have different thresholds and/or constraints than other sets of shipments.

The solver 120 may determine that a distance between a first origin of a first shipment and a second origin of a second shipment is less than a threshold distance for combining shipments. The solver 120 may determine that a distance between the first destination and the second destination is less than a threshold distance for combining shipments. The solver 120 may determine that an amount of time between the first specified delivery date and the second specified delivery date is less than a threshold amount of time between delivery dates for combining shipments. When two shipping requests include pickup locations, the solver 120 may determine that a distance between the first pickup location and the second pickup location is less than a threshold distance for combining shipments. When two shipping requests include pickup dates, the solver 120 may determine that an amount of time between the first pickup date and the second pickup date is less than a threshold amount of time for combining shipments. When two shipping requests include pickup times, the solver 120 may determine that an amount of time between the first pickup time and the second pickup time is less than a threshold amount of time for combining shipments. When two shipping requests include delivery times, the solver 120 may determine that an amount of time between the first delivery time and the second delivery time is less than a threshold amount of time for combining shipments. Thresholds for times may include an amount of time to travel from one location to another, and may therefore depend on specified origins or destinations. Thresholds for distances may include an amount (e.g., of miles) a carrier will have to drive to get from one location to another and may therefore depend on specified origins or destinations.

Thresholds may indicate that two shipments should not be combined if the cost to ship the combined freight will not be lower and if the scheduling constraints cannot be met by the carrier. Thresholds may be combined. For example, if a carrier of a first shipment will pass through a location that is an origin of a second shipment and a location that is a destination of the second shipment on the way to delivering the first shipment and if pooling the two shipments results in cost savings, then the shipments may be considered to be within threshold distances of each other. Similarly, if a difference in time for delivering a first shipment and for delivering a second shipment exceeds a threshold amount of time, then even if the origin and destination locations are within threshold distances of each other, the solver 120 may determine not to combine the two shipments (e.g., if two shipments are to leave from the same origin location and arrive at the same destination location but the first shipment needs to arrive within 24 hours while the second shipment does not need to arrive until the end of a week, the solver 120 may determine not to pool the two shipments).

In some embodiments, the system 100 includes non-transitory, computer-readable medium comprising computer program instructions tangibly stored on the non-transitory computer-readable medium, wherein the instructions are executable by at least one processor to perform the methods described above in connection with FIGS. 2 and/or 3.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, SCALA, PYTHON, TYPESCRIPT, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
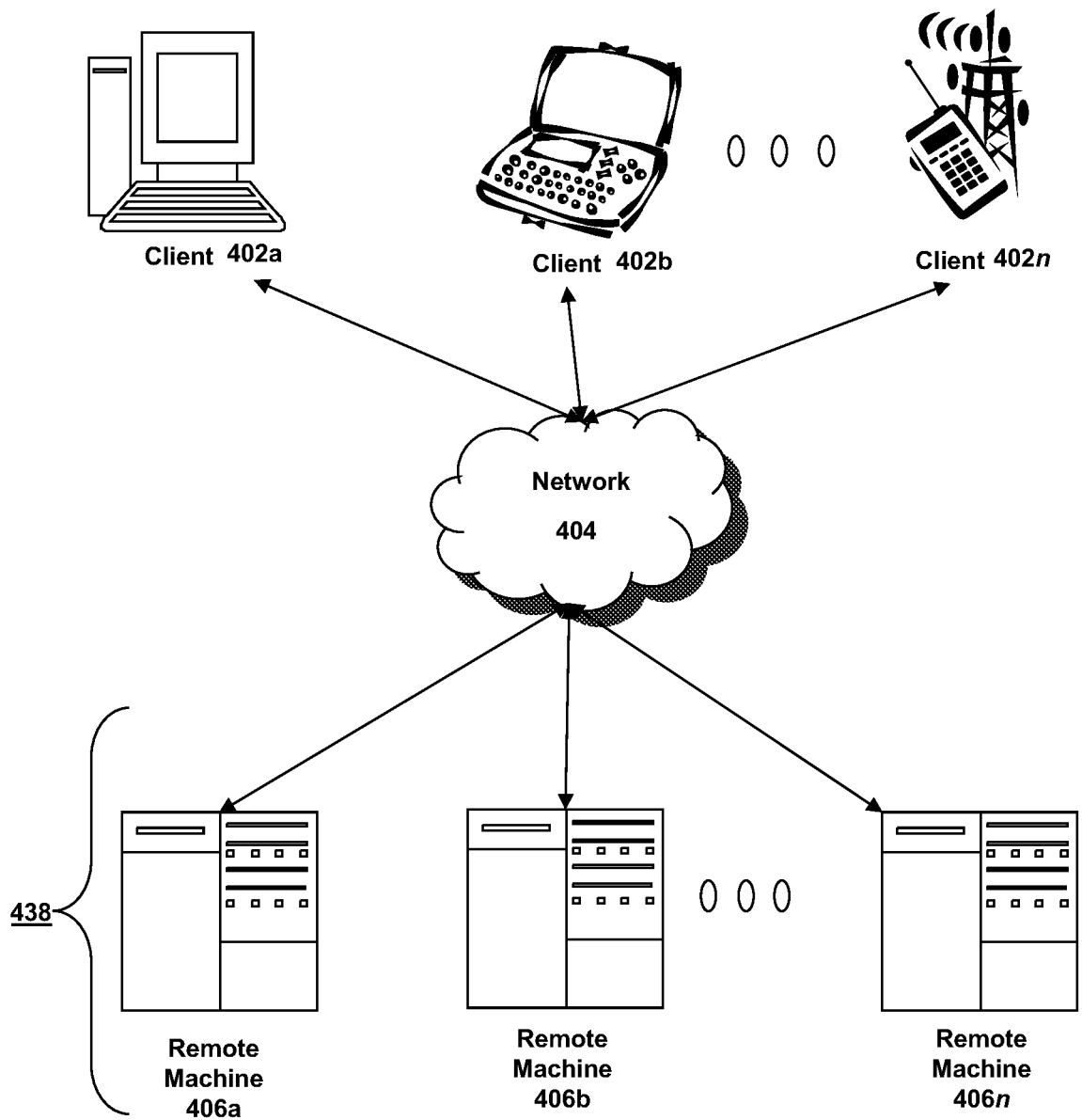
FIGS. 4A-4C are block diagrams depicting embodiments of computers useful in connection with the methods and systems described herein.
Figure 4B:
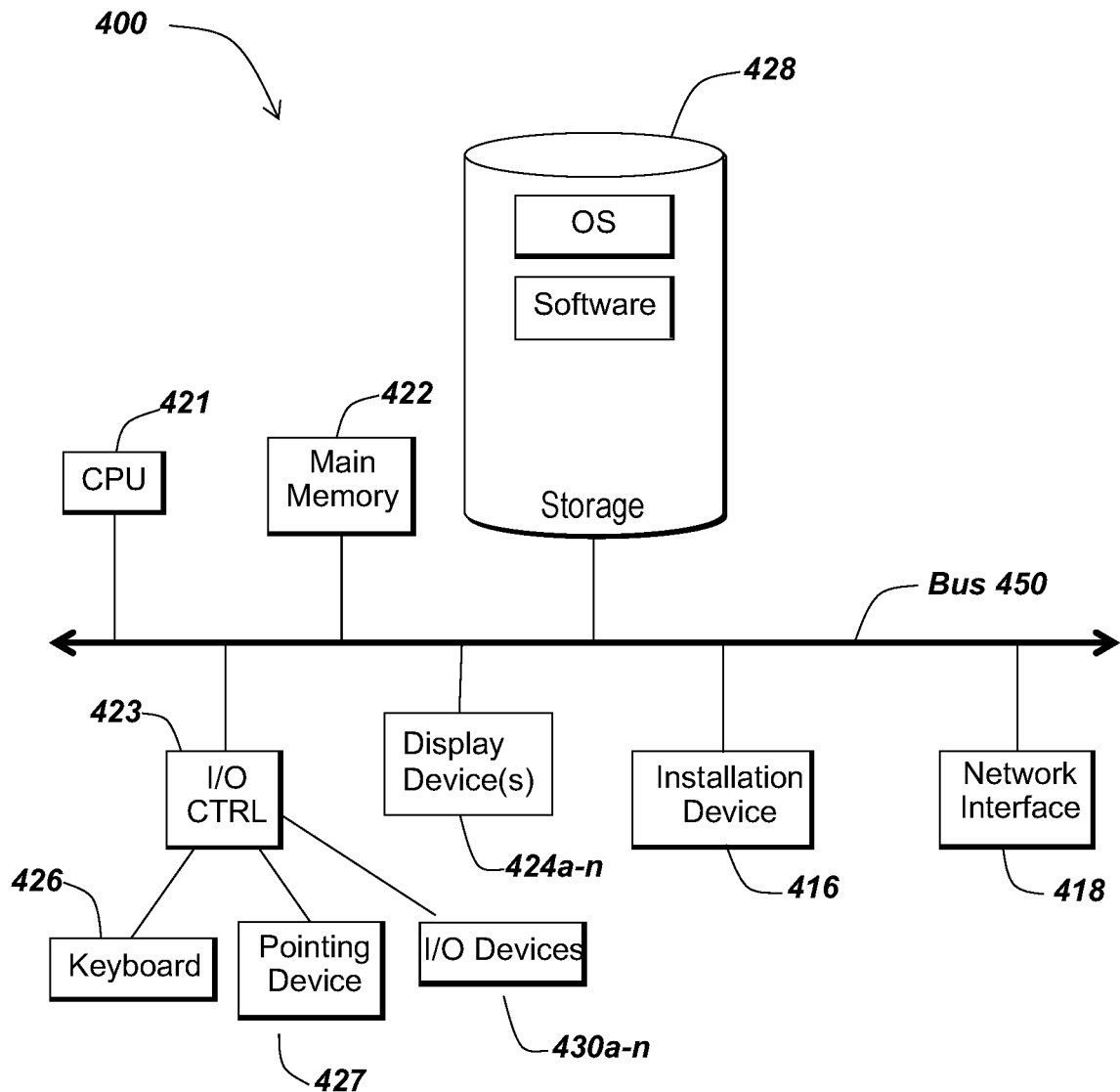
Figure 4C:
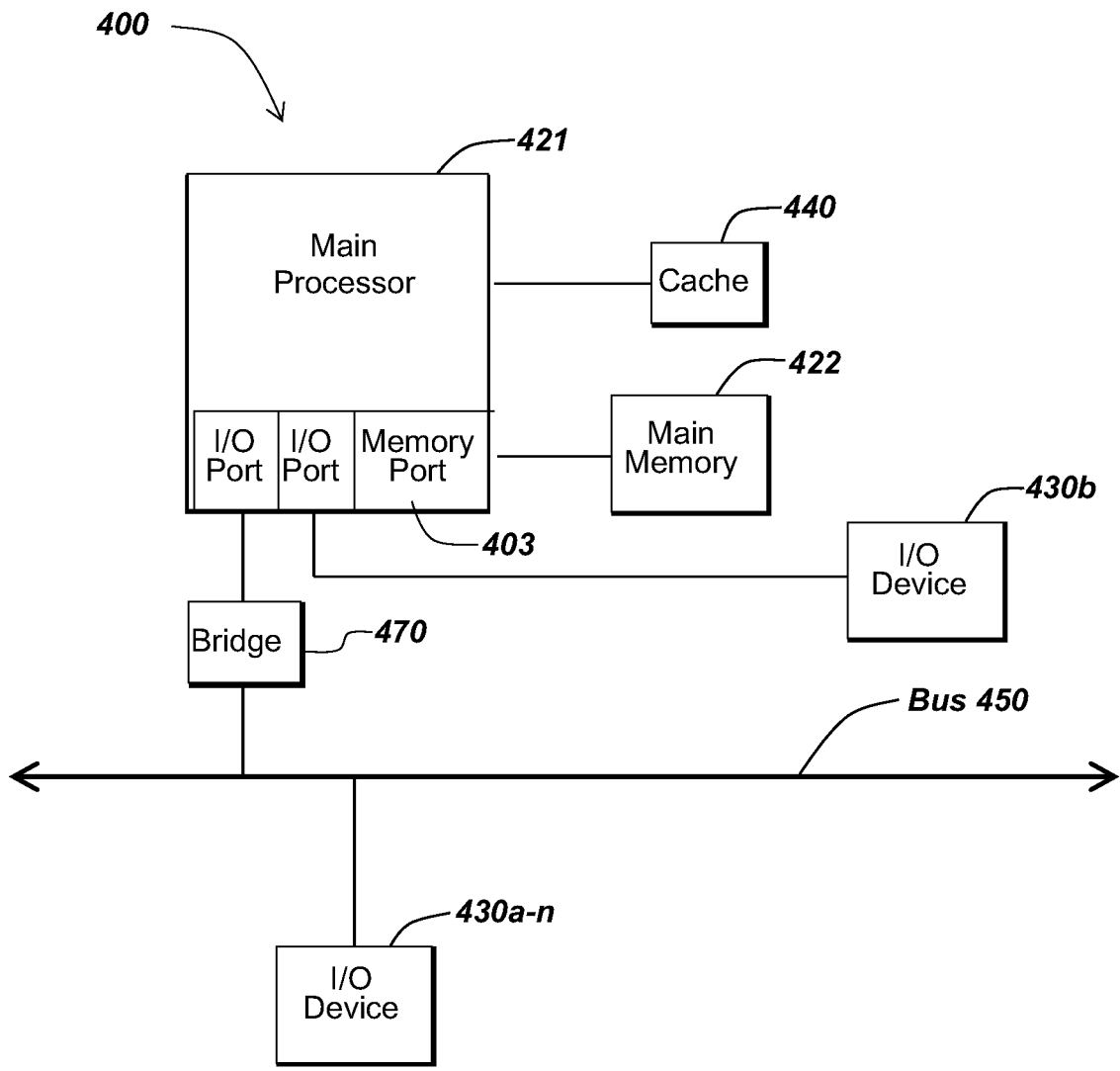

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402a-402n (also generally referred to as local machine(s) 402, client(s) 402, client node(s) 402, client machine(s) 402, client computer(s) 402, client device(s) 402, computing device(s) 402, endpoint (s) 402, or endpoint node(s) 402) in communication with one or more remote machines 406a-406n (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 402.

In one embodiment, a computing device 406 provides functionality of a web server. The web server may be any type of web server, including web servers that are open-source web servers, web servers that execute proprietary software, and cloud-based web servers where a third party hosts the hardware executing the functionality of the web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the ORACLE WEBLOGIC products provided by Oracle Corporation of Redwood Shores, Calif.

In some embodiments, the system may include multiple, logically-grouped remote machines 406. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 702 or a remote machine 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 400 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, Calif.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linux-variant operating system distributed by Red Hat, Inc., of Raleigh, N.C.; Ubuntu, a freely-available operating system distributed by Canonical Ltd. of London, England; or any type and/or form of a Unix operating system, among others.

Having described certain embodiments of methods and systems for optimizing the pooling and shipping of freight, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for pooling a plurality of shipments of less than full truckloads of freight to create a full truckload with an optimized loading order and delivery route satisfying at least one scheduling requirement for each of the plurality of shipments and providing a service level guarantee for each of the plurality of shipments, the method comprising:
   (a) receiving a request from a first shipper for delivery of a first shipment of less than a full truckload of freight between an origin and a destination by a specified delivery date in accordance with a level of service guaranteed for a full truckload of freight;
   (b) determining, by a pricing engine executing on a first computing device, a first price for shipping the shipment according to a first rate for shipping the less than the full truckload of freight between the origin and the destination by the specified delivery date;
   (c) determining, by the pricing engine, a second price for shipping the shipment according to a second rate for shipping a full truckload of freight between the origin and the destination by the specified delivery date;
   (d) providing a commitment to ship the shipment for the first shipper between the origin and the destination by the specified delivery date in accordance with the level of service guaranteed for the full truckload of freight at a third price that is lower than at least the second price, wherein providing the commitment further comprises updating a user interface to display the delivery date and the third price and the level of service guaranteed;
   (e) receiving, after providing the commitment to ship the shipment for the first shipper, a request from a second shipper for delivery of a second shipment of less than a full truckload of freight between the origin and the destination by the specified delivery date;
   (f) determining, by a solver executing on the computing device and in communication with the pricing engine, to combine the first shipment and the second shipment into a full truckload of freight;
   (g) generating, by the solver, a route and a schedule for picking up the first shipment and the second shipment that comply with the service level guaranteed and result in delivery of each of the first shipment and the second shipment by the specified delivery date;
   (h) repeating (a)-(g) for at least twenty-three additional shipments;
   (i) directing a carrier of full truckloads of freight to execute the schedule for picking up at least the first shipment of less than the full truckload of freight and at least the second shipment of less than the full truckload of freight and to follow the identified route to deliver each of the first shipment and the second shipment by the specified delivery date.

2. The method of claim 1, wherein receiving the request from the first shipper further comprises receiving a request specifying a pickup location for the delivery.

3. The method of claim 1, wherein receiving the request from the first shipper further comprises receiving a request specifying a pickup date for the delivery.

4. The method of claim 1, wherein receiving the request from the first shipper further comprises receiving a request specifying a pickup time for the delivery.

5. The method of claim 1, wherein receiving the request from the first shipper further comprises receiving a request specifying a delivery time for the delivery.

6. The method of claim 1, wherein determining the first price for shipping the shipment according to the first rate for shipping the less than the full truckload of freight between the origin and the destination by the specified date further comprises receiving the first rate from a less than full truckload carrier.

7. The method of claim 1, wherein determining the first price for shipping the shipment according to the first rate for shipping the less than the full truckload of freight between the origin and the destination by the specified date further comprises deriving an estimated first rate for shipping a partial truckload of freight.

8. The method of claim 1 further comprising providing a commitment to ship the shipment for the second shipper between the origin and the destination by the specified date in accordance with the level of service guaranteed for the full truckload of freight at a fourth price that is lower than at least the second price.

9. The method of claim 8, wherein the fourth price is the same as the third price.

10. The method of claim 1, wherein providing the commitment to the first shipper further comprises providing the commitment to ship the shipment for the first shipper between the origin and the destination by the specified date in accordance with the level of service guaranteed for the full truckload of freight at the third price that is lower than the first price and the second price.

11. The method of claim 1, wherein receiving the request from the second shipper further comprises receiving a request specifying a pickup location.

12. The method of claim 1, wherein receiving the request from the second shipper further comprises receiving a request specifying a pickup date.

13. The method of claim 1, wherein receiving the request from the second shipper further comprises receiving a request specifying a pickup time.

14. The method of claim 1, wherein receiving the request from the second shipper further comprises receiving a request specifying a delivery time.

15. The method of claim 1, wherein determining, by the solver, to combine the first shipment and the second shipment further comprises determining, by the solver, that combining the first shipment and the second shipment would meet at least one scheduling constraint and be deliverable by the specified date.

16. The method of claim 1, wherein determining, by the solver, to combine the first shipment and the second shipment further comprises determining, by the solver, that combining the first shipment and the second shipment would meet at least one shipping vehicle constraint.

17. The method of claim 1, wherein determining, by the solver, to combine the first shipment and the second shipment further comprises determining, by the solver, that combining the first shipment and the second shipment would satisfy at least one shipping compatibility constraint.

18. The method of claim 1, wherein determining, by the solver, to combine the first shipment and the second shipment further comprises determining, by the solver, that combining the first shipment and the second shipment exceeds a level of cost savings provided by combining the first shipment with a third shipment requested by a third shipper for delivery of a third shipment of less than full truckloads of freight between the origin and the destination by the specified date.

19. The method of claim 1 further comprising:
receiving, after providing the commitment to ship the shipment for the first shipper and after determining to combine the first shipment and the second shipment and before shipment of the combined first shipment and second shipment, a request for a third shipment requested by a third shipper for delivery of a third shipment of less than the full truckload of freight between the origin and the destination by the specified date; and
determining to combine the first shipment and the third shipment instead of the first shipment and the second shipment.

20. The method of claim 1 further comprising:
receiving, after providing the commitment to ship the shipment for the first shipper and after determining to combine the first shipment and the second shipment and before shipment of the combined first shipment and second shipment, a request for a third shipment requested by a third shipper for delivery of a third shipment of less than the full truckload of freight between the origin and the destination by the specified date; and
determining to combine the first shipment, the second shipment, and the third shipment into a full truckload of freight.

* * * * *

UNITED STATES PATENT AND TRADEMARK OFFICE
CERTIFICATE OF CORRECTION

PATENT NO. : 11,238,400 B2  
APPLICATION NO. : 17/118132  
DATED : February 1, 2022  
INVENTOR(S) : Saenz et al.

Page 1 of 1

It is certified that error appears in the above-identified patent and that said Letters Patent is hereby corrected as shown below:

In the Drawings

In Sheet 6 of 6, FIG. 4C, for Tag "430a-n" delete "I/O Device" and insert -- I/O Devices --, therefor.

In the Specification

In Column 18, Line 23, delete "100" and insert -- 400 --, therefor.

In Column 18, Line 29, delete "memory 422" and insert -- memory unit 422 --, therefor.

In Column 18, Line 32, delete "memory 422" and insert -- memory unit 422 --, therefor.

In Column 18, Line 34, delete "memory 422" and insert -- memory unit 422 --, therefor.

In Column 18, Line 48, delete "display 424" and insert -- display device 424 --, therefor.

In Column 18, Line 50, delete "display 424" and insert -- display device 424 --, therefor.

Signed and Sealed this  
Seventh Day of February, 2023

Katherine Kelly Vidal  
*Director of the United States Patent and Trademark Office*